UNITED STATES PATENT OFFICE.

GADIENT ENGI AND CARL JAGERSPACHER, OF BASEL, SWITZERLAND, ASSIGNORS TO SOCIETY OF CHEMICAL INDUSTRY IN BASLE, OF BASEL, SWITZERLAND.

CHROMIUM COMPOUNDS OF AZODYESTUFFS AND PROCESS OF MAKING SAME.

1,259,499.     Specification of Letters Patent.     Patented Mar. 19, 1918.

No Drawing.     Application filed November 29, 1915. Serial No. 64,023.

*To all whom it may concern:*

Be it known that we, Dr. GADIENT ENGI and Dr. CARL JAGERSPACHER, both chemists, citizens of the Swiss Republic, and residents of Basel, Switzerland, have invented new Chromium Compounds of Azodyestuffs and Processes of Making Same, of which the following is a full, clear, and exact specification.

We have found that new chromium compounds of azodyestuffs containing groups able to combine with chromium, can be obtained by combining the hitherto unknown chromium compond of an orthooxydiazobody with an azodyestuff-component containing at least one group able to be chromated. The thus obtained products containing chromium can be employed for dyeing from an acid bath, whereby they furnish tints which are intermediate between those of the corresponding azodyestuffs themselves and those of the subsequently chromated dyeings obtained by treating the dyeings obtained with the said azodyestuffs subsequently with a chromate.

The preparation of the new chromium compounds of orthooxydiazobodies, used as intermediate products in the new process, is effected by boiling the aqueous solutions of the corresponding orthoaminophenol compounds, as for instance 4:2:1-nitroaminophenol, 2:1:4-aminophenol sulfonic acid, picramic acid, an orthoaminonaphtholsulfonic acid, or of the sodium salts of these derivatives of orthoaminophenol with a chromium compond, as for instance chromium oxid or a chromium salt, and diazotizing the thus obtained chromium compound of the orthoaminophenolcompounds according to the usual methods; for this latter operation, the solution of the chromium compound obtained after boiling and cooling down may be employed directly or the chromimum compound of the orthoaminophenolcompounds can be isolated from this solution by evaporation, etc., and afterward dissolved again before it is diazotized. The combination of the thus obtained chromium compound of orthrooxydiazobodies, which are yellow to brown substances soluble in water, with an azodyestuff containing at least one group able to be chromated as, for instance, a phenol, an aminophenol, a naphthol, an aminonaphthol, or one of their sulfoderivatives occurs also according to known methods, whereby half chromated orthooxyazodyestuffs are obtained.

The process for the manufacture of these compounds is illustrated by the following examples.

Example 1: 15.4 parts 4:2:1-nitroaminophenol are heated with 350 parts water, 13.6 parts crystallized sodium acetate and 11 parts chromium fluorid for 3 to 4 hours at 100° C. in a vessel provided with a reflux cooler. After the mass is completely cooled down, the residue is separated by filtration and the filtered liquid saturated with common salt. The easily soluble chromium compound of 4:2:1-nitroaminophenol separates progressively as a yellow-brown precipitate. It is diazotized in the known manner and the resulting diazobody is combined with 1:8:3:6-aminonaphtholdisulfonic acid in a sodaalkaline solution. The obtained dyestuff solution is filtered hot and the half chromated dyestuff is precipitated from the filtered liquid by adding common salt. The dyestuff can eventually be purified by redissolution.

It dyes wool from an acid bath blue tints while the sodium salt of the dyestuff "4:2:1-nitrodiazophenol + 1:8:3:6-aminonaphtholdisulfonic acid" dyes wool from an acid bath red-violet tints. The fastness to washing, alkalis and light is essentially improved and these fastness properties are between those of the dyeings obtained with the specified sodium salt of the dyestuff and those of the same dyeings subsequently treated with a chromate. By treating subsequently the dyeings of the half chromated dyestuffs with a chromate the same green tints of the same fastness properties are obtained as by treating subsequently the dyeings of the sodium salt with a chromate.

Example 2: 18.9 parts 2:1:4-aminophenolsulfonic acid are transformed with 300 parts water and 4 parts sodium hydroxid into the corresponding sodium salt. The filtered solution is united to a filtered solution of 10.5 parts chromium fluorid in 100 parts water and to a similar solution of 27.2 parts crystallized sodium acetate and the whole is heated for about 4 hours on a water bath. The resulting chromium compound is very easily soluble, its solution is concentrated, diazotized in the known manner and combined with a soda alkaline solution of sodium-betanaphtholate. The solution of dyestuff is heated in order to dissolve the partly separated dyestuff and filtered; from the filtered liquid the dyestuff is precipitated by addition of common salt and eventually purified by redissolution. The dyestuff dissolves in water to Bordeaux-red coloration and in concentrated sulfuric acid with light blue-red coloration and it dyes wool from an acid bath brownish Bordeaux-red tints, while the sodium salt of the dyestuff "orthoaminophenolsulfonic acid+beta-naphthol" dyes wool pure red tints. The fastnesses to washing, alkalis and light are essentially improved; they are intermediate between those of the dyeings obtained with the said sodium salt and those of these latter dyeings subsequently treated with chromates; by treating subsequently the dyeings of the half chromated dyestuff with a chromate the same violet tints are obtained as by treating subsequently with a chromate the dyeings of the specified sodium salt of the dyestuff.

Example 3: 19.9 parts picramic acid are boiled with 1750 parts water, 10.5 parts chromium fluorid and 13.6 parts crystallized sodium acetate, for about 15 hours, in a vessel provided with a reflux cooler and then filtered hot. There remains a residue I. The filtered liquid is concentrated by evaporation, whereby a precipitate II separates, which is isolated by filtration and suction. Both parts I and II of the new chromium compound are diazotized in known manner and united with a sodaalkaline solution of 1:8:2:4-aminonaphtholdisulfonic acid. In both cases the difficultly soluble dyestuff is precipitated and is separated by filtration from the mother-lye free of dyestuff. The dyestuff is then extracted with water, the thus obtained solution is filtered and from the filtered liquid the dyestuff is isolated by adding common salt. The dyestuff I dissolves in water to blue violet solutions and in concentrated sulfuric acid with bright, bluish-red coloration and dyes wool from an acid bath bluish grey-green tints, while the sodium salt of the dyestuff "diazotized picramic acid+1:8:2:4-aminonaphtholdisulfonic acid" dyes wool blue tints. The dyestuff II dissolves in water with a more reddish tint than the dyestuff I and dyes wool from an acid bath strong greenish-blue tints, which are as the tints obtained with the dyestuff I intermediate between the blue direct dyeings of the sodium salt of the dyestuff "diazotized picramic acid+1:8:2:4-aminonaphtholdisulfonic acid" and the green dyeings obtained by treating the said direct dyeings subsequently with a chromate. By treating the dyeings of the half chromated dyestuff subsequently with a chromate the same shade of the same fastness properties is obtained as by treating subsequently with chromate the dyeings of the sodium salt of the dyestuff.

Instead of the chromium fluorid specified in the examples other salts of chromium as chromium chlorid, chromium sulfate, etc., can be employed.

What we claim is:

1. The described process for the manufacture of chromium compounds of orthooxy-diazobodies, consisting in treating an orthoaminophenol compound with a chromium compound in a hot aqueous medium and diazotizing the thus obtained chromium compound of orthoaminophenol-compound.

2. The described process for the manufacture of chromium compounds of orthooxy-azodyestuffs consisting in treating an orthoaminophenol compound with a chromium compound in a hot aqueous medium, diazotizing the chromium compound of orthoaminophenol compound thus obtained and combining the resulting chromium compound of orthooxydiazobody with an azodyestuff component containing at least one group able to be chromated.

3. The described process for the manufacture of chromium compounds of orthodiazodyestuffs consisting in treating an orthoaminophenol compound with a chromium compound in a hot aqueous medium, diazotizing the thus obtained chromium compound of orthoaminophenol compound, combining the resulting chromium compound of orthooxydiazobody with a naphthol compound.

4. The described process for the manufacture of chromium compounds of orthodiazodyestuffs consisting in treating an orthoaminophenolcompound with a chromium compound in a hot aqueous medium; diazotizing the thus obtained chromium compound of orthoaminophenol compound, combining the resulting chromium compound of orthooxydiazobody with an aminonaphtholsulfonic acid.

5. As new products the herein described chromium compounds of orthooxydiazobodies constituting yellow to brown substances soluble in water.

6. As new products the herein described chromium compounds of orthooxyazodyestuffs, derived from a chromium compound of an orthooxydiazobody and a further component containing at least one group able to be chromated and constituting intense colored powders soluble in water and in concentrated sulfuric acid to intense colored solutions and dyeing animal fibers in acid baths tints which are intermediate between the dyeings obtained with the corresponding orthooxyazodyestuffs and those obtained by treating these latter dyeings subsequently with a chromate.

In witness whereof we have hereunto signed our names this 30th day of October, 1915, in the presence of two subscribing witnesses.

Dr. GADIENT ENGI.
Dr. CARL JAGERSPACHER.

Witnesses:
Arnold Zuber,
Amand Ritter.